Nov. 24, 1931.  C. E. ROBINSON  1,833,474
COVER FOR AUTOMOBILE DOORS
Filed June 17, 1930
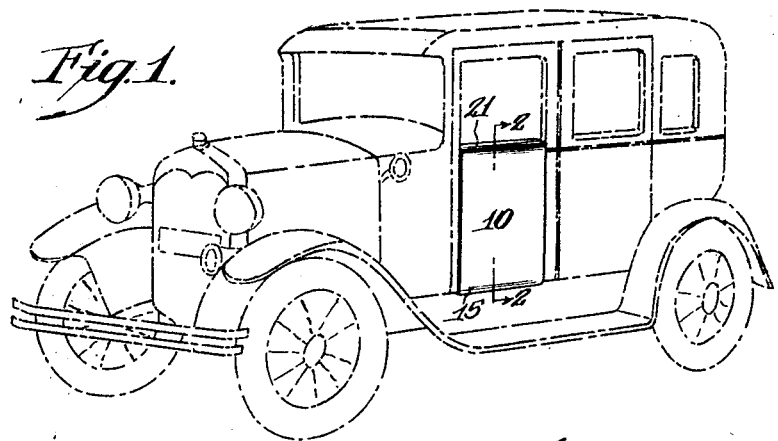
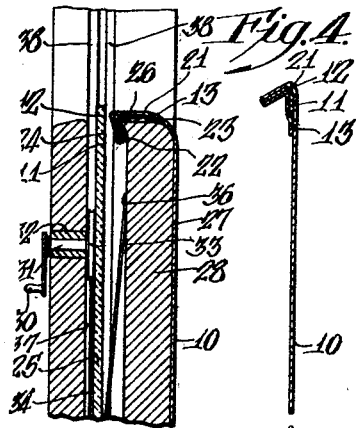
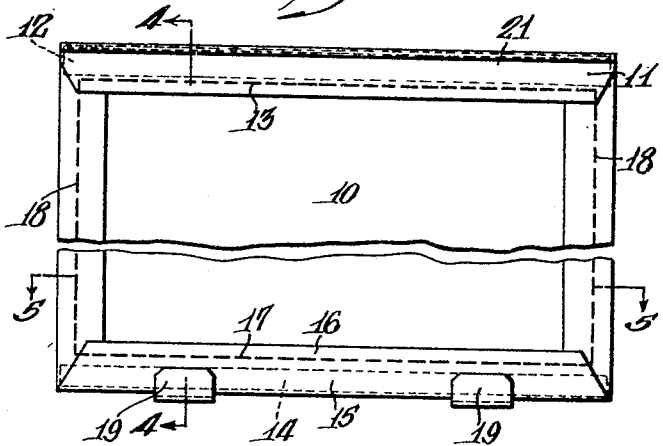
Inventor
Clayton E. Robinson
by
Attorney
Witnesses:
Elmer W. Hacker
Walter Chimy Patented Nov. 24, 1931

1,833,474

UNITED STATES PATENT OFFICE

CLAYTON E. ROBINSON, OF BOSTON, MASSACHUSETTS

COVER FOR AUTOMOBILE DOORS

Application filed June 17, 1930. Serial No 461,681.

My invention relates to covers for automobile doors or the like.

A purpose of my invention is to provide a cover of leather or some other flexible material such, for instance, as one of the several artificial leathers which are on the market, that can be readily attached to or detached from the door of an automobile.

A further purpose is to retain a cover for an automobile door by fastenings at the top and bottom of the door held in place by the resilience of the cover.

A further purpose is to use a hook for the upper fastening of an automobile door cover and at the same time as a window sill for the window of the door.

A further purpose is to provide a detachable cover of leather, artificial leather or other flexible water-proofed material or the like with angle iron stiffening means at its upper end adapted to make hook engagement with the window sill in a door, and a stiffening rod at its lower end carrying protruding prongs to make hook engagement with the bottom flange of the door.

A further purpose is to provide a cover construction that may comprise a flexible cover with or without advertising matter thereon, that can be stretched from the window ledge, to the bottom of an automobile door.

A further purpose is to provide a cover that is durable, inexpensive of manufacture and which well meets the requirements of service.

Further purposes will appear in the specification and in the claims.

Referring to the drawings:

I have elected to show one main form only of my invention, with a modification, selecting a form that is convenient and efficient in operation and which well illustrates the principles involved.

Figure 1 is a perspective view showing in full lines my improved cover applied to a door of an automobile, the automobile being shown in dot and dash lines.

Figure 2 is a sectional view taken on the line 2—2 of Figure 1.

Figure 3 is a rear elevation of my cover in a flattened position.

Figure 4 is a transverse section taken on the line 4—4 of Figure 3.

Figure 5 is a sectional plan view taken on the line 5—5 of Figure 3.

Figure 6 is a fragmentary view similar to Figure 1, but showing printing on the cover.

Figure 7 is a fragmentary perspective showing a modification.

Like numerals indicate like parts in all figures.

Many times owners of automobiles containing display advertising matter wish to use their cars for both business and pleasure riding and in some sections of large cities business display advertising printed on the car is forbidden by the authorities.

My invention is directed to allow a car to be used for either business or pleasure, by use of my improved cover.

By the adaptation of my cover construction it is only a matter of convenience whether or not it will contain advertising matter, and in case the car carries no advertising, and the owner desires such a condition, this can very easily be accomplished by using my construction and applying thereon any desired inscription.

In the drawings it will be clearly seen that my construction can be easily applied to the door of an automobile very quickly and securely.

My cover comprises a strip of flexible material of any suitable color, such as artificial leather, or the like 10, which is folded at 11 about and glued to a piece of angle iron 12, the folded end of the leather being sewed at 13 to the main strip 10, forming the upper end of my cover construction. On the lower end of my cover I place a flat metal strip 14, surrounding the strip 14 with a lower end portion 15, of the flexible material 10, and sewing the end 16 of leather to the main strip of the cover 10, at 17.

The sides of the cover 10 are turned and stitched together at 18 to form completed edges.

Short strips of metal are welded or otherwise secured to flat strip 14 and project through openings 20 in the cover 10, to form hooks 19.

The upper end 21 containing the angle iron 12 of my cover is adapted to placement about the bead 22 of the ledge or sill 23 of the window.

The angle iron 12 being covered prevents scraping or marring of the body of the door.

This covering fitting on the ledge of the window forms a window sill that is smooth, and if anyone should rest an arm thereon there will be no roughened surfaces or projections to destroy or mar his clothing.

Being flexible the cover 10 fits neatly over the ledge or sill horizontally at 26 and then vertically at 27 to cover the door 28 and at the lower end the hooks 19 engage the flange 29 at the bottom of the door.

Figure 2 shows one of the many means employed for raising the glass 25 in the door, in which a handle 30 mounted on a shaft 31 in a bearing 32, a pulley 33 to which a cord 34 is secured, the cord 34 extends downwardly and at 35 supports the glass 25, the opposite end of the cord being fastened to the door at 36 in a slot or groove 37.

By rotating the handle 30 the pulley 33 is revolved causing the cord 34 to be wound on the pulley 33 thereby moving the glass 25 upwardly, but the glass being guided at its ends 38 allows for free movement of the glass vertically, the angle iron offering no interference with the movement of the glass.

In applying my cover to a door, the user will place the upper end containing the angle iron in the slot or groove 37, the flexible material portion will fit over the sill or ledge and follow the contour of the door, the cover is then pulled downwardly tightly and the natural resilience of the material will allow hooks 19 to be placed about the flange of the door bottom, the tension holding the hooks securely.

In the form shown in Figure 7 I use a flat strip 14' at the upper end of the cover and weld or otherwise fasten to the strip hooks 19' which make the connection to the door by placing the hooks 19' in the groove 37 provided in the door.

This form of Figure 7 is not as desirable as that shown in other figures as there is not the top or surface smoothness present in this form as in Figures 1 to 6, and this smoothness is desirable because anyone may rest an arm on the ledge or sill while sitting in the car when the window is open.

It will be clearly seen that my cover will be particularly adapted to quick and easy application or removal and also inexpensive to manufacture and at the same time will meet the needs of service.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

It will be obvious that my invention requires no change from existing types of manufacture of door and of window casings in the door but cooperates with existing types; and that the same resilience which holds the cover in place keeps the edges of the cover tightly in engagement with the surface of the door avoiding danger of separation by reason of wind or other causes.

Having thus described my invention, what I claim as new and desire to secure by Letters Patent is:—

1. An automobile door cover of resilient material normally smaller than the distance between the window sill and the lower edge of the door and fastenings for the ends of the cover engaging between the window casing and the window at the top and beneath a door flange at the bottom and held in position by the resilience of the intervening flexible cover.

2. An automobile door cover for a door having a window in it, composed of resilient material in conjunction with a fastening for the cover at the top forming also a window sill for the driver and a fastening at the bottom, the resilience of the material holding the fastenings in place.

3. A cover for an automobile door comprising a resilient covering material, stiffening strips at the top and bottom and fastenings connected with the stiffening strips engaging respectively within the window space of the door and below the bottom door flange, the resilience of the material holding the fastenings in place.

4. A cover for an automobile door comprising a resilient covering material, stiffening strips at the top and bottom comprising an angle iron at the top fitting within the window space of the door and hooks at the bottom engaging the door flange, the resilience of the material holding the fastenings in place.

5. An automobile door cover of resilient material, in combination with transversely extending stiffening strips at the two ends of the cover having hook engagement respectively with the window slot and lower door flange respectively of the door and one of the strips directly engaging therewith.

6. An automobile door cover of resilient material, in combination with transversely extending stiffening strips at the two ends of the cover and hooks connected with the strips to engage respectively within the window slot in the door and with the lower door flange.

CLAYTON E. ROBINSON.